O. MAURER.
SUNSHADE.
APPLICATION FILED JUNE 24, 1920.
1,370,546.
Patented Mar. 8, 1921.
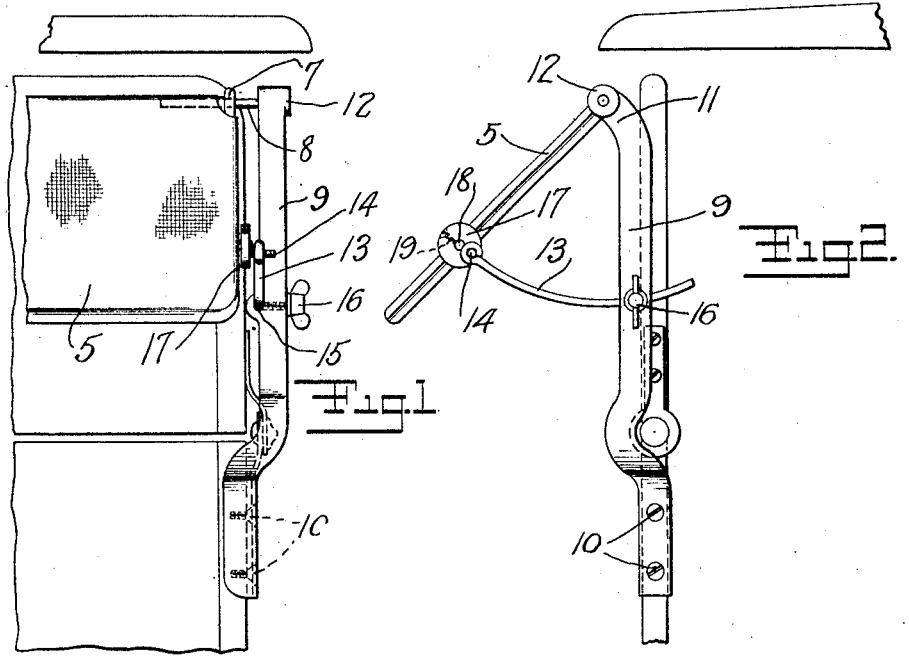
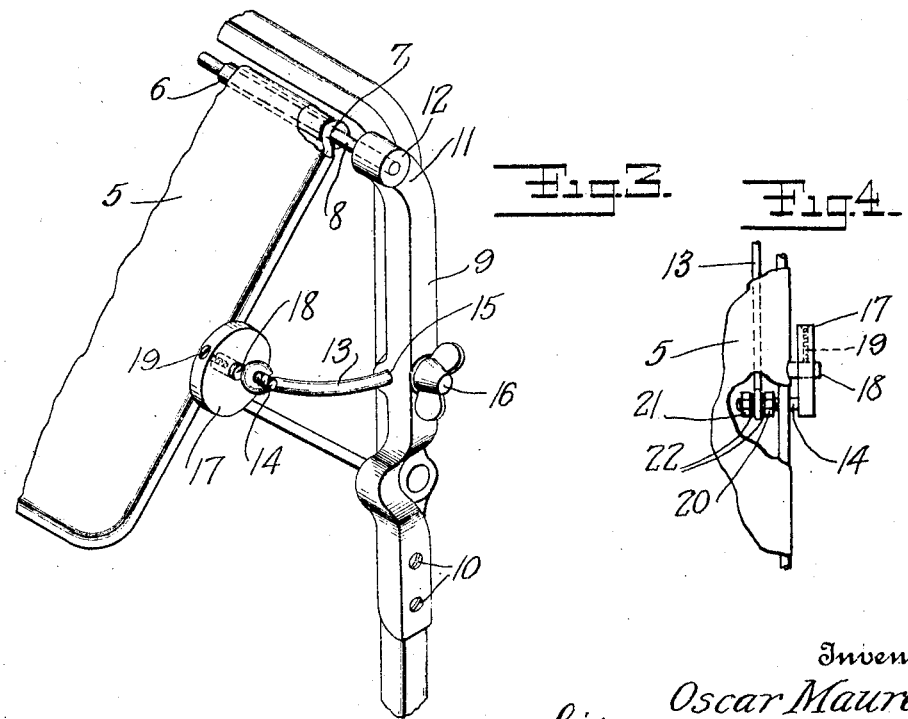
Inventor
Oscar Maurer
By his Attorney
Philip S. McLean.

UNITED STATES PATENT OFFICE.

OSCAR MAURER, OF RICHMOND HILL, NEW YORK.

SUNSHADE.

1,370,546.       Specification of Letters Patent.       Patented Mar. 8, 1921.

Application filed June 24, 1920. Serial No. 391,384.

*To all whom it may concern:*

Be it known that I, OSCAR MAURER, a citizen of the United States, and a resident of Richmond Hill, Queens county, and State of New York, have invented certain new and useful Improvements in Sunshades, of which the following is a specification.

My present invention is an automobile sunshade for protecting motorists from the glare and heat of the sun and from the glare of the lights encountered in night driving.

Special objects of the invention are to provide a device of this character in such form that it may be readily applied to automobiles now in use and which will be relatively light in weight, simple and inexpensive.

A further object is to make the device in such form that it may be readily adjusted to different size cars and windshields.

In the accompanying drawing I have illustrated the invention embodied in one of its most simple, practical forms, but wish it understood that changes and modifications may be made in the structure without departure from the true spirit and scope of the invention.

In the drawing referred to:

Figure 1 is a broken front elevation of the invention as applied to a windshield of conventional type.

Fig. 2 is a broken side view thereof.

Fig. 3 is a broken front perspective view of the invention, and Fig. 4 is an enlarged detail view of the adapter.

The sunshade proper is in the form of a panel of some sun-shielding material, such as canvas or the like, and is herein shown as a fabric covering 5 stretched over a light frame 6 having socket 7 at opposite ends thereof to receive supporting spindles 8.

These supporting spindles are carried by brackets 9 which may be attached to any suitable portion of the vehicle, such as the dash or the windshield, as by means of the securing screws 10. The spindle carrying portions at the upper ends of these brackets are shown as forwardly offset, as indicated at 11, to position the spindles in advance of the upper end of the windshield.

The spindles which form the pivotal support for the sunshade may be secured in the forwardly offset upper ends of the brackets in any practical way, but at the present time I prefer to secure said spindles by so positioning them that when the brackets are formed, inclosing bushings 12 will be cast about the ends of the spindles. The spindles are thus in effect integrally ignited with the brackets.

The shade is held in variously adjusted angular positions by means, consisting in the illustration, of the arms or links 13 pivoted to the panel at 14 and extending through bearings 15 formed in the upright portions of the brackets, said arms being secured in the adjusted relation in such bearings by means of the thumb screws 16.

The supporting spindles have a sliding fit in the sockets provided in the ends of the panel and therefore allow for a certain amount of adjustment to fit windshields of different width. To prevent binding of the supporting arms when the sunshade is applied to windshields of different width, I have provided an adapter shown in the form of a disk-like member 17 adjustably secured on the studs 18 projecting from the ends of the sunshade frame by means of set screws 19, said disks carrying the pivot pins 14 with which the arms are engaged. In the drawing the adapters are shown arranged with the pivot studs 14 projecting outwardly or away from the ends of the sunshade, but if desired, these adapters can be faced in the opposite direction so that the pivot pins 14 will project inwardly. Either one or both of the adapters can thus be reversed so as to bring the pivots 14 substantially in line with the bearings 15 and thus prevent cramping of the supporting arms 13. These adapters may also be adjusted longitudinally of the supporting studs and angularly thereabout so as to produce a proper fit and relation of the parts.

The device of my invention is relatively simple and inexpensive and is readily attachable to various forms of windshields now in use and provides a sunshade which can be easily raised or lowered and secured at an angle where it will shield the driver from the sun or from lights which may be annoying to the eyes.

In Fig. 4 I have indicated more fully how the adapter may be reversed to have the pivot pin 14 project beneath the sunshade panel. I have also shown more fully in this view how the pivoted end of the supporting arm may be positively located upon the pivot pin between the positioning nuts 20 and 21, locking washers 22 being interposed to hold these parts in the adjusted relation.

This construction makes it possible to positively adjust the outer ends of the supporting arms to properly "line up" with the bearings provided therefor in the supporting posts.

What I claim is:

1. In a device of the character described, an angularly adjustable sunshade panel, an adapter having a pivot stud projecting from one face thereof, a panel supporting arm engaging said pivot stud and means for reversibly securing said adapter to the panel to face the pivot stud either outwardly or inwardly of the panel.

2. An automobile sunshade comprising a panel of sunshade material provided with sockets in the opposite ends of the same, a one-piece supporting post at each end of said panel provided with means at its lower end enabling the attachment of the same to the windshield frame or supporting structure of an automobile, said posts each having a lateral guide passage in the upright portion thereof above said attaching means and a clamp screw adjacent said passage, opposed spindles carried by the upper ends of the posts above the guide passages and clamp screws, said spindles being fixedly secured to the upper ends of the posts and slidingly engaging in the sockets in the ends of the panel so that the sunshade may be applied to the supporting structure by simply securing the lower ends of the upright posts, the sliding engagement of the spindles with the panel allowing for relative adjustment of the posts during the application of the same to the supporting structure, and arms pivotally engaged with the opposite ends of the panel, said arms sliding through the guide passages in the posts and adjustably held by the clamp screws aforesaid.

3. An automobile sunshade comprising a panel of sunshade material provided with sockets in the ends thereof, upright supporting posts having means at the lower ends thereof for securing the same in position on an automobile and provided with fixed spindles at the upper ends thereof slidingly engaging in the end sockets of the sunshade panel, studs projecting from the ends of the sunshade panel, adapters adjustably secured on said studs and provided with pivot bearings and panel supporting arms engaged with the pivot bearings of said adjustable adapters.

4. An automobile sunshade comprising a panel of sunshade material provided with sockets in the ends thereof, upright supporting posts having means at the lower ends thereof for securing the same in position on an automobile and provided with fixed spindles at the upper ends thereof slidingly engaging in the end sockets of the sunshade panel, studs projecting from the ends of the sunshade panel, adapters adjustably secured on said studs and provided with pivot bearings, panel supporting arms engaged with the pivot bearings of said adjustable adapters, the supporting posts having bearings receiving said arms and clamp screws mounted in the posts and adjustably engaging the arms.

5. In a device of the character described, an angularly adjustable panel, an adapter angularly and reversibly adjustable on said panel, a pivot bearing carried by said adapter and a supporting arm engaged with said pivot bearing.

6. In a device of the character described, an angularly adjustable panel provided with a projecting stud, an adapter rotatably and reversibly mounted on said stud, means for securing said adapter in adjusted relation on the stud, a pivot pin projecting from one face of said adapter and a supporting arm engaged with said pivot pin.

7. In a device of the character described, an angularly adjustable panel, an adapter adjustably secured on the end of said panel and provided with a pivot stud, a supporting arm engaged with said pivot stud and means for positively positioning said arm at different points longitudinally on said pivot stud and comprising nuts engaged on the pivot stud, said stud being threaded to receive said nuts.

In witness whereof, I have hereunto set my hand this 17th day of June, 1920.

OSCAR MAURER.